United States Patent
Roh et al.

(10) Patent No.: US 7,554,308 B2
(45) Date of Patent: Jun. 30, 2009

(54) DIGITAL DC-DC CONVERTER USING DIGITAL MODULATION

(75) Inventors: Jeong-Jin Roh, Seocho-gu (KR); Sung-Jin Park, Seodaemoon-gu (KR)

(73) Assignee: Industry-University Cooperation Foundation Hanyang University, Seoul (KR)

( * ) Notice: Subject to any disclaimer, the term of this patent is extended or adjusted under 35 U.S.C. 154(b) by 221 days.

(21) Appl. No.: 10/591,891

(22) PCT Filed: Feb. 4, 2005

(86) PCT No.: PCT/KR2005/000331

§ 371 (c)(1),
(2), (4) Date: Jun. 11, 2007

(87) PCT Pub. No.: WO2005/086332

PCT Pub. Date: Sep. 15, 2005

(65) Prior Publication Data

US 2007/0279034 A1    Dec. 6, 2007

(30) Foreign Application Priority Data

Mar. 8, 2004    (KR) ............ 10-2004-0015559

(51) Int. Cl.
*H02M 3/157*    (2006.01)
(52) U.S. Cl. .............. 323/282; 323/283; 323/351
(58) Field of Classification Search ............... 323/267, 323/273, 280, 282, 283, 349, 351; 341/118, 341/143
See application file for complete search history.

(56) References Cited

U.S. PATENT DOCUMENTS

| | | | |
|---|---|---|---|
| 5,677,618 A | 10/1997 | Fiez et al. | |
| 6,456,217 B1 | 9/2002 | Esaki | |
| 6,621,257 B2 | 9/2003 | Mitamura et al. | |
| 6,653,960 B2 | 11/2003 | Mitamura et al. | |
| 6,731,763 B1 | 5/2004 | Dent | |
| 7,362,254 B2* | 4/2008 | Kost | 341/155 |
| 7,429,940 B2* | 9/2008 | Melanson | 341/143 |
| 2008/0204160 A1* | 8/2008 | Prodic et al. | 332/109 |
| 2008/0204290 A1* | 8/2008 | Parayandeh et al. | 341/143 |
| 2008/0303501 A1* | 12/2008 | Prodic | 323/283 |

FOREIGN PATENT DOCUMENTS

WO    9747090 A1    12/1997

* cited by examiner

*Primary Examiner*—Adolf Berhane
(74) *Attorney, Agent, or Firm*—The Webb Law Firm

(57) ABSTRACT

A digital DC-DC converter is implemented using first-order delta-sigma modulation, rather than A/D conversion. In the DC-DC converter, a PWM generator converts an input DC voltage to a preset level DC voltage according to an input PWM signal. A converter converts the DC voltage from the PWM generator to a preset level voltage. A delta-sigma modulator converts a feedback voltage Vfd corresponding to the output voltage Vout of the converter to a 1-bit digital voltage Vo according to a preset reference voltage Vref. A counter counts logic 1's in 1-bit digital voltage signals Vo from the delta-sigma modulator. A delay controller controls a high-level delay time according to the number of logic 1's counted by the counter and transfers a PWM signal having the controlled high-level delay time to the PWM generator.

4 Claims, 6 Drawing Sheets

DIGITAL DC-DC CONVERTER USING DIGITAL MODULATION

TECHNICAL FIELD

The present invention relates to a digital DC-DC converter using digital modulation, and more particularly to a digital DC-DC converter using digital modulation, which is implemented using first-order delta-sigma modulation, rather than A/D conversion, thereby reducing the proportion of analog circuitry and increasing the proportion of digital circuitry in the total circuitry of the digital DC-DC converter, so that the circuitry of the digital DC-DC converter is simplified and it is also easy to design the circuitry, thereby increasing the efficiency of the digital DC-DC converter.

BACKGROUND ART

In order to operate normally, most modern electronic devices require a constant voltage supply. Digital DC-DC converters are generally used to supply constant DC voltage to circuits such as Very Large Scale Integrated (VLSI) circuits or system-on-chip circuits.

Digital DC-DC converters convert an analog voltage output through an output terminal to a digital output voltage, and then compare the digital output voltage with a preset reference voltage to adjust the output voltage to a desired level. To accomplish this, digital DC-DC converters typically use a Pulse Width Modulation (PWM) controller as shown in FIG. 1.

FIG. 1 is a block diagram of a conventional digital DC-DC converter.

The conventional digital DC-DC converter shown in FIG. 1 is a PWM digital DC-DC converter, which includes a power switch 110, a rectifier 120, an A/D converter 130, a duty up/down determinator 140, and a PWM duty controller 150. The switch 110 switches on/off an input voltage Vin according to an input switching signal, and the rectifier 120 rectifies a voltage output from the power switch 110. The A/D converter 130 converts an analog output voltage Vout of the rectifier 120 to a digital signal, and the duty up/down determinator 140 determines duty up/down based on the digital signal from the A/D converter 130. The PWM duty controller 150 controls switching of the power switch 110 for duty control based on the duty up/down determination signal from the duty up/down determinator 140.

The conventional DC-DC converter typically employs a digital scheme using a flash A/D converter, and adjusts the output voltage Vout by comparing it with a reference voltage.

Since the output voltage Vout of the DC-DC converter is analog, the DC-DC converter uses the A/D converter 130 for interfacing with the digital components such as the up/down determinator 140 and the PWM duty controller 150. A flash A/D converter is typically used as the A/D converter 130.

DISCLOSURE OF INVENTION

However, since the flash A/D converter requires complex analog circuitry, the overall circuitry of the conventional DC-DC converter is complicated, which makes it difficult to design and implement the circuitry thereof and causes high power consumption.

Therefore, the present invention has been made in view of the above problems, and it is an object of the present invention to provide a digital DC-DC converter using digital modulation, which is implemented using first-order delta-sigma modulation, rather than A/D conversion, thereby reducing the proportion of analog circuitry and increasing the proportion of digital circuitry in the total circuitry of the digital DC-DC converter, so that the circuitry of the digital DC-DC converter is simplified and it is also easy to design the circuitry, thereby increasing the efficiency of the digital DC-DC converter.

SUMMARY OF THE INVENTION

In accordance with the present invention, the above and other objects can be accomplished by the provision of a digital DC-DC converter using digital modulation, comprising a PWM generator for converting an input DC voltage to a DC voltage of a preset level according to an input PWM signal; a conversion portion for converting the DC voltage output from the PWM generator to a voltage of a preset level; a delta-sigma modulator for converting a feedback voltage Vfd corresponding to the output voltage of the conversion portion to a 1-bit digital voltage according to a preset reference voltage; a counter for counting logic 1's included in 1-bit digital voltage signals output from the delta-sigma modulator on a predetermined bit-unit basis; and a delay controller for controlling a high-level delay time according to the number of logic 1's counted by the counter, and transferring a PWM signal having the controlled high-level delay time to the PWM generator.

The digital DC-DC converter is implemented using first-order delta-sigma modulation, rather than A/D conversion, thereby reducing the proportion of analog circuitry and increasing the proportion of digital circuitry in the total circuitry of the digital DC-DC converter, so that the circuitry of the digital DC-DC converter is simplified and it is also easy to design the circuitry, thereby increasing the efficiency of the digital DC-DC converter.

BRIEF DESCRIPTION OF DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Now, preferred embodiments of the present invention will be described in detail with reference to the annexed drawings.

Figure 2:
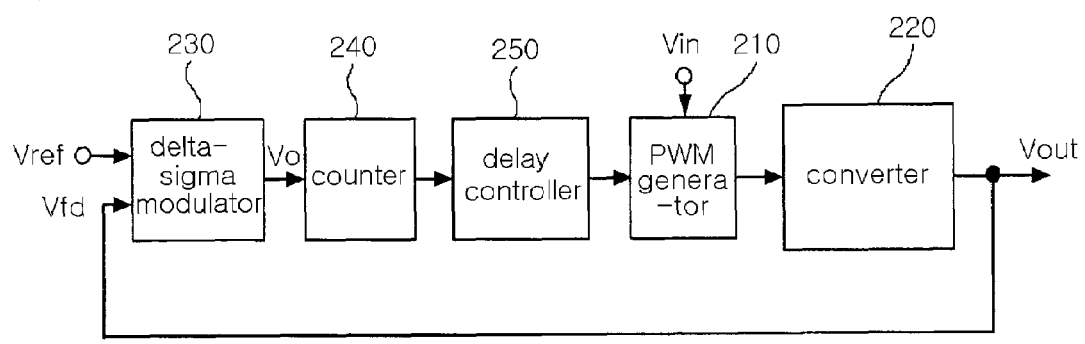
FIG. 2 is a block diagram of a digital DC-DC converter according to the present invention.

FIG. 2 is a block diagram of a digital DC-DC converter according to the present invention.

As shown in FIG. 2, the digital DC-DC converter according to the present invention comprises a PWM generator 210, a converter 220, a delta-sigma modulator 230, a counter 240, and a delay controller 250. The PWM generator 210 converts an input DC voltage to a DC voltage of a preset level according to an input PWM signal. The converter 220 converts the DC voltage output from the PWM generator 210 to a voltage of a preset level. The delta-sigma modulator 230 converts a feedback voltage Vfd, which corresponds to the output voltage Vout of the converter 220, to a 1-bit digital voltage Vo according to a preset reference voltage Vref. The counter 240 counts logic 1's included in 1-bit digital voltage signals Vo output from the delta-sigma modulator 230 on a predetermined bit-unit basis. The delay controller 250 controls a high-level delay time according to the number of logic 1's, which is counted by the counter 240, and transfers a PWM signal having the controlled high-level delay time to the PWM generator 210.

Figure 3:
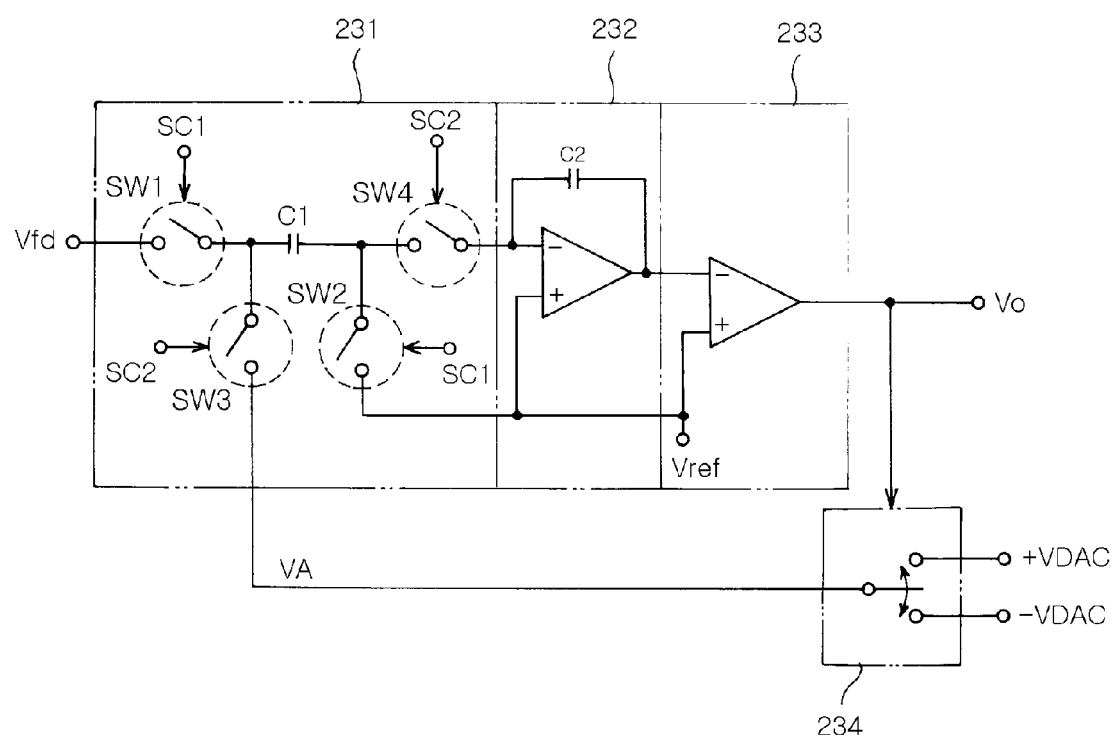
FIG. 3 is a circuit diagram of a first-order delta-sigma modulator shown in FIG. 2.

FIG. 3 is a circuit diagram of a first-order delta-sigma modulator 230 shown in FIG. 2.

As shown in FIG. 3, the delta-sigma modulator 230 comprises a switched capacitor portion 231, an integrator 232, a comparator 233, and a D/A converter 234. The switched capacitor portion 231 is switched according to first and second non-overlapping clock signals SC1 and SC2 having two phases, so as to sample each of the feedback voltage Vfd and an output voltage VA of the D/A converter 234. The integrator 232 integrates each of the voltages sampled by the switched capacitor portion 231. The comparator 233 compares a voltage output from the integrator 232 with a preset reference voltage Vref, and outputs a 1-bit digital voltage Vo having a logic state of "1" or "0". The D/A converter 234 converts the digital voltage Vo output from the comparator 233 to a preset analog voltage VA according to the logic state of the digital voltage Vo, and transfers the analog voltage VA to the switched capacitor portion 231.

The delta-sigma modulator 230 is implemented as a first-order delta-sigma modulator, which outputs a 1-bit digital voltage signal of "1" or "0" and has the same function as the conventional 1-bit A/D converter for converting an input analog voltage to a digital voltage.

Figure 4:
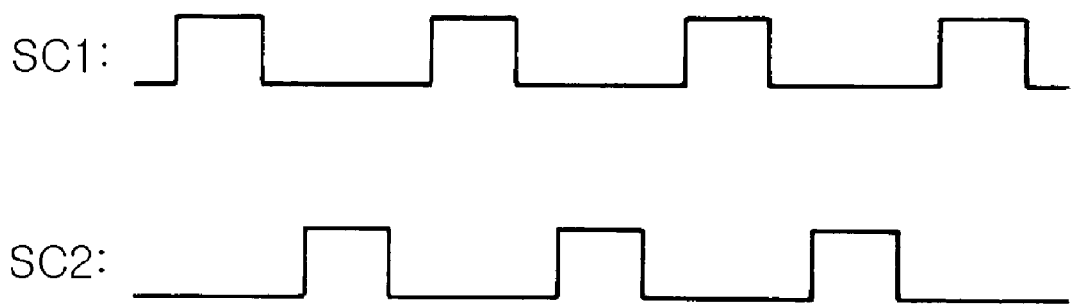
FIG. 4 is a diagram showing the waveforms of first and second non-overlapping clock signals having two phases.

FIG. 4 shows the waveforms of the first and second non-overlapping clock signals SC1 and SC2 having two phases. The first clock signal SC1 is composed of pulses with a duty ratio less than 50%, and the second clock signal SC2 is also composed of pulses with a duty ratio less than 50%. The second clock signal SC2 is at high level when the first clock signal SC1 is at low level, so that the first and second clock signals SC1 and SC2 do not overlap.

As shown in FIG. 3, the switched capacitor portion 231 comprises a capacitor C1, a first switch SW1, a second switch SW2, a third switch SW3, and a fourth switch SW4. The first switch SW1 is turned on/off according to the first clock signal SC1 to selectively connect the capacitor C1 with an input terminal of the switched capacitor portion 231 through which the feedback voltage Vfd is received. The second switch SW2, which is connected with the first switch SW1 via the capacitor C1, is turned on/off according to the first clock signal SC1 to selectively connect the capacitor C1 with the reference voltage Vref. The third switch SW3 is turned on/off according to the second clock signal SC2 to selectively connect a connection node between the first switch SW1 and the capacitor C1 with the output of the D/A converter 234. The fourth switch SW4 is turned on/off according to the second clock signal SC2 to selectively connect the capacitor C1 with an output terminal of the switched capacitor portion 231, which is connected with the integrator 232.

If the digital voltage Vo output from the comparator 233 has a logic state "1", the D/A converter 234 converts the output digital voltage Vo to a preset negative analog voltage−VA, and transfers it to the switched capacitor portion 231. If the digital voltage Vo output from the comparator 233 has a logic state "0", the D/A converter 234 converts the output digital voltage Vo to a preset positive analog voltage+VA, and transfers it to the switched capacitor portion 231.

The operation and advantages of the digital DC-DC converter according to the present invention will now be described in more detail with reference to the drawings.

As shown in FIG. 2, the PWM generator 210 in the digital DC-DC converter according to the present invention converts an input DC voltage Vin to a DC voltage of a preset level according to an input PWM signal. Specifically, an internal power switch in the PWM generator 210 is turned on or off according to the PWM signal, and the Input DC voltage Vin is converted to a DC voltage of a preset level according to the on/off operation of the internal power switch.

The converter 220 according to the present invention converts the DC voltage output from the PWM generator 210 to a voltage of a preset level. For example, the converter 220 can be implemented as a buck converter or a boost converter. If the converter 220 is a buck converter, it steps the DC voltage output from the PWM generator 210 down to a voltage of preset level. On the other hand, if the converter 220 is a boost converter, it steps the DC voltage output from the PWM generator 210 up to a voltage of preset level.

The delta-sigma modulator 230 according to the present invention converts a feedback voltage Vfd, which corresponds to the output voltage Vout of the converter 220, to a 1-bit digital voltage Vo according to a preset reference voltage Vref, which is described in detail below with reference to FIGS. 3 and 4.

As shown in FIGS. 3 and 4, the switched capacitor portion 231 in the delta-sigma modulator 230 is switched according to first and second non-overlapping clock signals SC1 and SC2 having two phases, so as to sample each of the feedback voltage Vfd and an output voltage VA of the D/A converter 234 and then to transfer each of the sampled voltages to the integrator 232.

The switched capacitor portion 231 is described in more detail below.

As shown in FIG. 4, each of the first and second clock signals SC1 and SC2 has two phases, i.e., high and low levels. High level portions of the first and second clocks signals do not overlap and low level portions thereof also do not overlap.

The first and second switches SW1 and SW2 are turned on according to the first clock signal SC1, so that the switched capacitor portion 231 operates in sampling mode in which it samples an input voltage. The third and fourth switches SW3 and SW4 are turned on according to the second clock signal SC2, so that the switched capacitor portion 231 operates in integrating mode in which it transfers the sampled voltage to the integrator 232 so that the sampled voltage is integrated in the integrator 232.

First, while the first and second switches SW1 and SW2 are turned on according to the first clock signal SC1, the third and fourth switches SW3 and SW4 are turned off. In this state, the switched capacitor portion 231 operates in sampling mode, in which a capacitor C2 of the integrator 232 is in hold state with the feedback voltage Vfd being applied to the integrator 232 via the capacitor C1.

Next, while the third and fourth switches SW3 and SW4 are turned on according to the second clock signal SC2, the first and second switches SW1 and SW2 are turned off. In this state, the switched capacitor portion 231 operates in integrating mode, in which a charge stored in the capacitor C1 flows to the capacitor C2 of the integrator 232.

The integrator 232 integrates the voltage sampled by the switched capacitor portion 231, and outputs the integrated voltage to the comparator 233.

The comparator 233 can be implemented as a 1-bit comparator, which converts an analog voltage output from the integrator 232 to a digital voltage. Specifically, if the output voltage of the integrator 232 is higher than a preset reference voltage Vref, the comparator 233 outputs a logic state "1", and if it is lower than the reference voltage Vref, the comparator 233 outputs a logic state "0". That is, the comparator 233 outputs a 1-bit digital voltage Vo with a logic state "1" or "0" according to the output voltage of the integrator 232.

The D/A converter 234 converts the digital voltage Vo output from the comparator 233 to a preset analog voltage VA according to the logic state of the digital voltage Vo, and transfers the analog voltage VA to the switched capacitor portion 231.

Specifically, if the digital voltage Vo output from the comparator 233 has a logic state "1", the D/A converter 234 converts the output digital voltage Vo to a preset negative analog voltage−VA, and transfers it to the switched capacitor portion 231. If the digital voltage Vo output from the comparator 233 has a logic state '0', the D/A converter 234 converts the output digital voltage Vo to a preset positive analog voltage+VA, and transfers it to the switched capacitor portion 231.

In FIG. 2, the counter 240 according to the present invention counts logic 1's included in 1-bit digital voltage signals Vo output from the delta-sigma modulator 230 on a predetermined bit-unit basis. For example, if the delta-sigma modulator 230 outputs an 8-bit sequence '1,0,1,0,1,0,1,0', an analog voltage corresponding to the output of the delta-sigma modulator 230 is given by Equation 1 under the assumption that a voltage corresponding to logic "1" is "3V", and a voltage corresponding to logic $$\frac{(1+0+1+0+1+0+1+0) \times 3 \text{ V}}{8(\text{bits})} = \frac{12}{8} = 1.5 \text{ V} \quad \text{[Equation 1]}$$

In addition, if the output of the delta-sigma modulator 230 has an 8-bit value "1,0,0,0,1,0,1,0", an analog voltage corresponding to the output of the delta-sigma modulator 230 is given by Equation 2.

$$\frac{(1+0+0+0+1+0+1+0) \times 3 \text{ V}}{8(\text{bits})} = \frac{9}{8} = 1.125 \text{ V} \quad \text{[Equation 2]}$$

If the input voltage of the delta-sigma modulator 230 is near the reference voltage Vref, its output voltage signal Vo has a repeating bit pattern of "1,0,1,0 . . .". If the input voltage of the delta-sigma modulator 230 is higher than the reference voltage Vref, its output voltage signal Vo has a larger number of logic 1's in the bit pattern, whereas if the input voltage of the delta-sigma modulator 230 is lower than the reference voltage Vref, its output voltage signal Vo has a smaller number of logic 0's in the bit pattern.

The delay controller 250 according to the present invention controls a high-level delay time according to the number of logic 1's, which is counted by the counter 240, and transfers a PWM signal having the controlled high-level delay time to the PWM generator 210.

Figure 5:
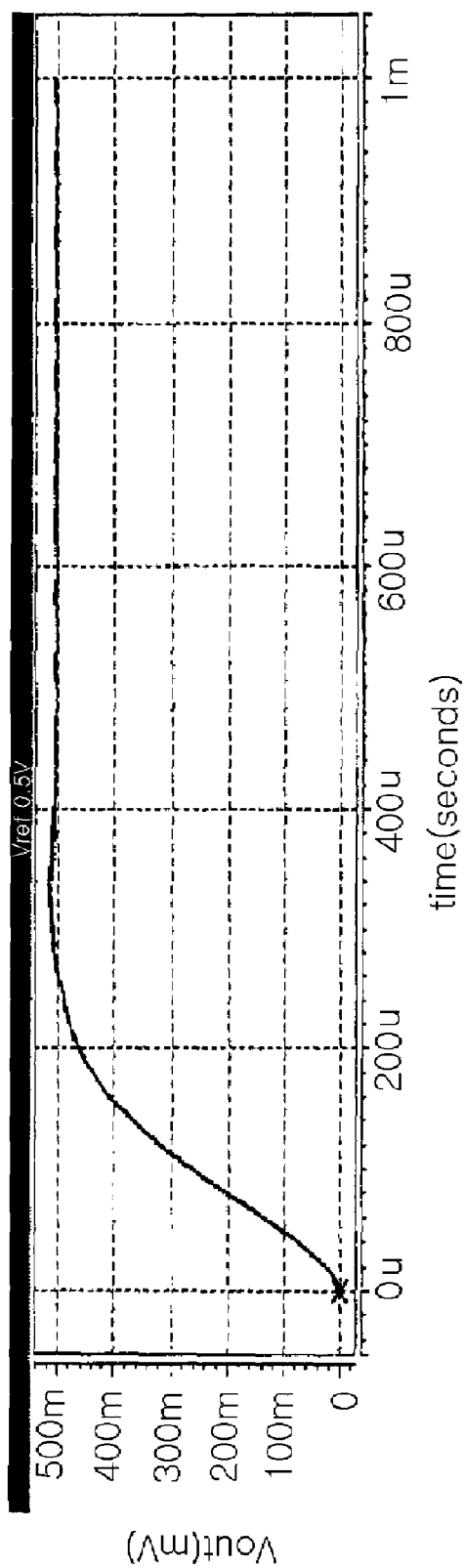
FIG. 5 is a characteristic diagram of the output voltage Vout of the DC-DC converter according to the present invention when a reference voltage Vref is fixed.

FIG. 5 is a characteristic diagram of the output voltage of the DC-DC converter according to the present invention when the reference voltage Vref is fixed.

This figure shows a simulation result of the DC-DC converter when the reference voltage Vref is fixed to 0.5V. It can be seen from FIG. 5 that the output voltage Vout of the DC-DC converter according to the present invention is stabilized to "0.5V" in a short time with almost no overshoot, as compared to the conventional digital converter.

Figure 6:
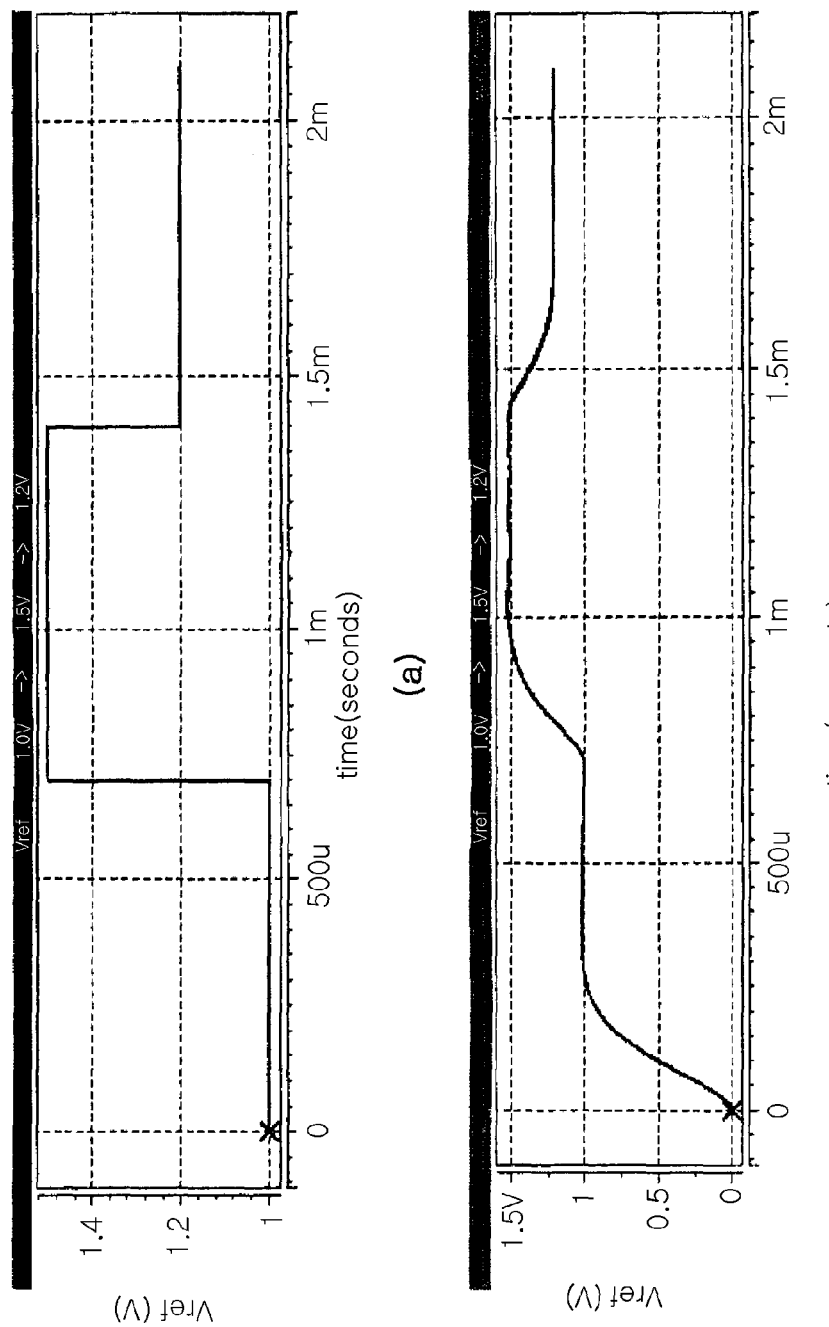
FIGS. 6a and 6b are characteristic diagrams of the output voltage Vout of the DC-DC converter according to the present invention when the reference voltage Vref is abruptly changed.
Figure 1:
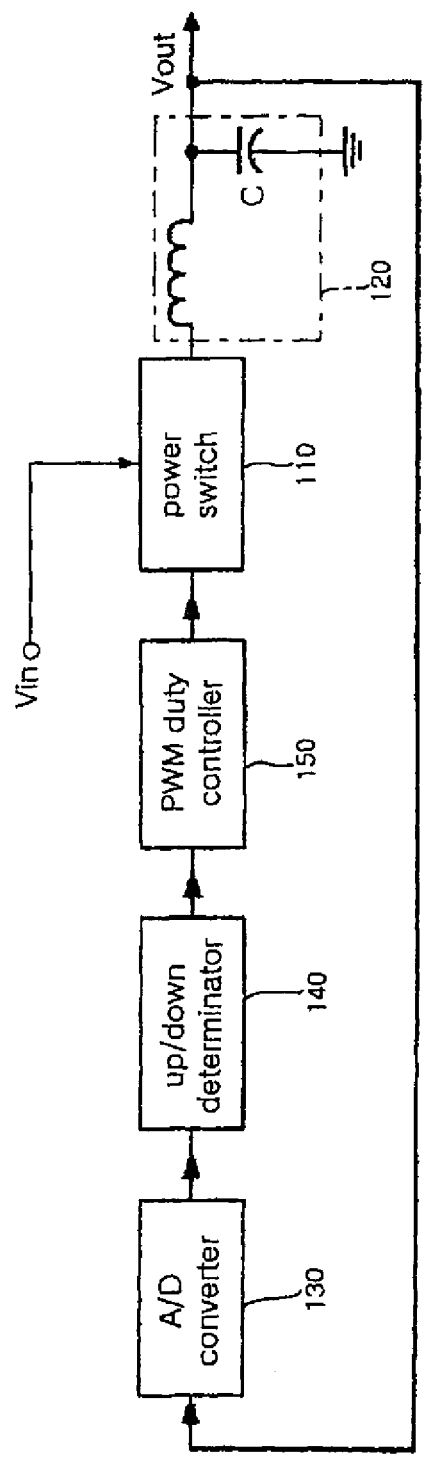

FIG. 6b is a characteristic diagram of the output voltage of the DC-DC converter according to the present invention when the reference voltage Vref is changed as shown in FIG. 6a.

FIGS. 6a and 6b show a result of a simulation of the DC-DC converter according to the present invention, which is performed to check how stably the digital DC-DC converter responds to the reference voltage Vref when the reference voltage Vref is abruptly changed. It can be seen from FIG. 6b that the output voltage Vout of the DC-DC converter according to the present invention very stably follows the reference voltage Vref even when the reference voltage Vref is abruptly changed from 1.0V→1.5V→1.2V as shown in FIG. 6a.

As described above, according to the digital DC-DC converter according to the present invention, if the output voltage Vout is higher than the reference voltage Vref, the delta-sigma modulator 230 outputs a digital voltage signal having a larger number of logic 1's, so that the counter 240 counts a larger number of logic 1's. On the contrary, if the output voltage Vout is lower than the reference voltage Vref, the delta-sigma modulator 230 outputs a digital voltage signal having a larger number of logic 0's, so that the counter 240 counts a smaller number of logic 1's. The digital DC-DC converter repeats this operation so that the output voltage Vout becomes equal to the reference voltage Vref, which allows stable voltage supply to the system.

As is apparent from the above description, the present invention provides a digital DC-DC converter using digital modulation, which is implemented using first-order delta-sigma modulation, rather than A/D conversion, thereby reducing the proportion of analog circuitry and increasing the proportion of digital circuitry in the total circuitry of the digital DC-DC converter, so that the circuitry of the digital DC-DC converter is simplified and it is also easy to design the circuitry, thereby increasing the efficiency of the digital DC-DC converter.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A digital DC-DC converter using digital modulation, comprising:
   a PWM generator for converting an input DC voltage to a DC voltage of a preset level according to an input PWM signal;
   a conversion portion for converting the DC voltage output from the PWM generator to a voltage of a preset level;
   a delta-sigma modulator for converting a feedback voltage Vfd corresponding to the output voltage of the conversion portion to a 1-bit digital voltage according to a preset reference voltage;
   a counter for counting logic 1's included in 1-bit digital voltage signals output from the delta-sigma modulator on a predetermined bit-unit basis; and
   a delay controller for controlling a high-level delay time according to the number of logic 1's counted by the counter, and transferring a PWM signal having the controlled high-level delay time to the PWM generator.

2. The converter as set forth in claim 1, wherein the delta-sigma modulator comprises:
   a switched capacitor portion for performing switching according to first and second non-overlapping clock signals having two phases, so as to sample each of the feedback voltage and an output voltage of the D/A converter;
   an integrator for integrating each of the voltages sampled by the switched capacitor portion;
   a comparator for comparing a voltage output from the integrator with the preset reference voltage, and outputting a 1-bit digital voltage having a logic state "1" or "0"; and
   a D/A converter for converting the digital voltage output from the comparator to a preset analog voltage according to the logic state of the digital voltage output from the comparator, and transferring the preset analog voltage to the switched capacitor portion.

3. The converter as set forth in claim 2, wherein the switched capacitor portion comprises:
   a first switch turned on/off according to the first clock signal to selectively connect the capacitor with an input terminal of the switched capacitor portion, the feedback voltage being received through the input terminal;
   a second switch connected with the first switch via the capacitor, the second switch being turned on/off according to the first clock signal to selectively connect the capacitor with the reference voltage;
   a third switch turned on/off according to the second clock signal to selectively connect a connection node between the first switch and the capacitor with the output of the D/A converter; and
   a fourth switch turned on/off according to the second clock signal to selectively connect the capacitor with an output terminal of the switched capacitor portion, the output terminal being connected with the integrator.

4. The converter as set forth in claim 2, wherein if the digital voltage output from the comparator has a logic state "1", the D/A converter converts the output digital voltage to a preset negative analog voltage, and transfers the preset negative analog voltage to the switched capacitor portion, and if the digital voltage output from the comparator has a logic state "0", the D/A converter converts the output digital voltage to a preset positive analog voltage, and transfers the preset positive analog voltage to the switched capacitor portion.

* * * * *

UNITED STATES PATENT AND TRADEMARK OFFICE
CERTIFICATE OF CORRECTION

| | | |
|---|---|---|
| PATENT NO. | : 7,554,308 B2 | |
| APPLICATION NO. | : 10/591891 | |
| DATED | : June 30, 2009 | |
| INVENTOR(S) | : Roh et al. | |

Figure 1:
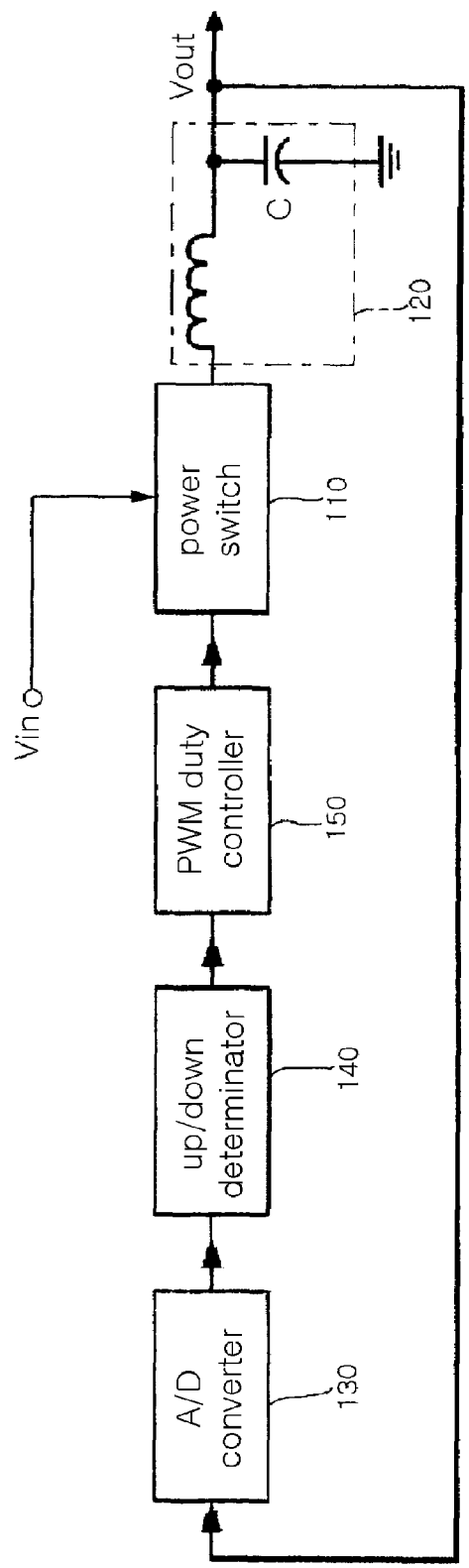
FIG. 1 is a block diagram of a conventional digital DC-DC converter.

It is certified that error appears in the above-identified patent and that said Letters Patent is hereby corrected as shown below:

In the drawing:
    Replace the existing FIG. 1 with the attached FIG. 1 that has the words "PRIOR ART" added to indicate that FIG. 1 is prior art.

Signed and Sealed this

Third Day of November, 2009

David J. Kappos
*Director of the United States Patent and Trademark Office*